United States Patent
Scherer et al.

(10) Patent No.: US 6,639,029 B1
(45) Date of Patent: Oct. 28, 2003

(54) PROCESS FOR CONTINUOUS SYNTHESIS OF POLYMER COMPOSITIONS AS WELL AS USE OF SAME

(75) Inventors: Markus Scherer, Lebach (DE); Joseph Martin Bollinger, North Wales, PA (US); David J. Cooper, Jr., Doylestown, PA (US); Larry Stephen Tillery, Langhorne, PA (US); Robert Woodruff, Jamison, PA (US)

(73) Assignee: Rohmax Additives GmbH, Darmstadt (DE)

( * ) Notice: Subject to any disclaimer, the term of this patent is extended or adjusted under 35 U.S.C. 154(b) by 109 days.

(21) Appl. No.: 09/709,354

(22) Filed: Nov. 13, 2000

(51) Int. Cl.⁷ .................................................. C08F 4/72
(52) U.S. Cl. ...................... 526/108; 526/145; 526/146; 526/147; 526/307.1; 526/319; 526/318.4; 526/90; 526/96; 526/135; 526/118
(58) Field of Search .............................. 526/135, 145, 526/146, 147, 307.1, 319, 318.4, 108, 96, 90, 118

(56) References Cited

U.S. PATENT DOCUMENTS 5,807,937 A * 9/1998 Matyjaszewski et al. ... 526/135

FOREIGN PATENT DOCUMENTS

| WO | WO 96/30421 | 10/1996 |
| WO | WO 98/40415 | * 9/1998 |

* cited by examiner

Primary Examiner—T. Zalukaeva
(74) Attorney, Agent, or Firm—Oblon, Spivak, McClelland, Maier & Neustadt, P.C.

(57) ABSTRACT

The present invention relates to a process for synthesis of polymer compositions, wherein ethylenically unsaturated monomers are polymerized by means of initiators containing a transferable atom or group of atoms and of one or more catalysts comprising at least one transition metal in the presence of ligands which can form a coordination compound with the metal catalyst or catalysts, the process being characterized in that the polymerization takes place by means of continuous process operation.

29 Claims, No Drawings

PROCESS FOR CONTINUOUS SYNTHESIS OF POLYMER COMPOSITIONS AS WELL AS USE OF SAME

The invention relates to processes for synthesis of polymer compositions, wherein ethylenically unsaturated monomers are polymerized by means of initiators containing a transferable atom or group of atoms and one or more catalysts comprising at least one transition metal in the presence of ligands which can form a coordination compound with the metal catalyst or catalysts.

Radical polymerization is an important commercial process for synthesis of diverse polymers, such as PMMA and polystyrene. It suffers from the disadvantage that it is relatively difficult to control the composition of the polymers, the molecular weight and the molecular weight distribution.

One solution to this problem is offered by the so-called ATRP process (=Atom Trasfer Radical Polymerization). It is assumed that this process comprises "living" radical polymerization, although the description of the mechanism is not to be construed as limitative. In this process a transition metal compound is reacted with a compound containing a transferable atom or group of atoms. Under these conditions the transferable atom or group of atoms is transferred to the transition metal compound, whereby the metal is oxidized. A radical that adds onto the ethylenic groups is formed in this reaction. The transfer of the atom or group of atoms to the transition metal compound is reversible, however, and so the atom or group of atoms is transferred back to the growing polymer chain, whereby a controlled polymerization system is formed. Accordingly, it is possible to control the composition of the polymer, the molecular weight and the molecular weight distribution.

This reaction procedure is described, for example, by J-S. Wang et al., J. Am. Chem. Soc., Vol. 117, pp. 5614–5615, and by Matyjaszewski, Macromolecules., Vol. 28, pp. 7901–7910 (1995). Furthermore, International Patent Applications WO 96/30421, WO 97/47661, WO 97/18247, WO 98/20050, WO 98/40415 and WO 99/10387 disclose modifications of the aforesaid ATRP.

The mechanism described hereinabove is not undisputed. WO 97/47661, for example, states that polymerization takes place by insertion, and not by a radical mechanism. Such a differentiation is not pertinent to the present invention, however, since in the reaction procedure disclosed in WO 97/47661 there are used compounds which are also employed for ATRP.

The monomers, transition metal catalysts, ligands and initiators are chosen on the basis of the polymer solution desired. It is assumed that a high rate constant of the reaction between the transition metal/ligand complex and the transferable atom or group of atoms as well as a low equilibrium concentration of free radicals, is essential for a narrow molecular weight distribution. If the free radical concentration is too high, typical termination reactions will occur, leading to a broad molecular weight distribution. The exchange rate depends, for example, on the transferable atom or group of atoms, on the transition metal, on the ligands and on the anion of the transition metal compound. The person skilled in the art will find valuable advice on selection of these compounds in, for example, International Patent WO 98/40415.

The advantages of known ATRP processes, however, are largely limited to monomers which are themselves polar or which are readily soluble in polar media. Certainly the occasional use of nonpolar aprotic hydrocarbons such as benzene, toluene, xylene, cyclohexane and hexane is also known from the literature, but the polymers synthesized with these solvents exhibit much greater polydispersity. This effect is described in, for example, WO 98/40415.

The same document also discloses the possibility of polymerizing polar monomers such as methyl methacrylate or styrene by means of metallic copper, but the molecular weight distribution is much more unfavorable than in the use of a mixture of $Cu^0/CuBr$ or $Cu^0/CuBr_2$.

In Pol. Preprint (ACS, Div. Pol. Chem)., 1999, 40(2), 432, M. J. Ziegler et al. state among other facts that the polymerization of t-butyl methacrylate is difficult to control if the said process takes place in bulk. Both the molecular weight and the polydispersity can be improved by using approximately 20 to 25 wt % of polar solvents. Of course, because of the limited solubility in polar solvents of ethylenically unsaturated ester compounds containing alkyl or heteroalkyl groups with at least 8 carbon atoms, it is difficult by means of the known ATRP processes to polymerize ethylenically unsaturated monomer mixtures that contain at least 50 wt % of ethylenically unsaturated ester compounds containing alkyl or heteroalkyl chains with at least 8 carbon atoms. Furthermore, depending on use, these large volumes of polar solvents must be separated from the composition after synthesis of the polymers.

A further disadvantage of the known ATRP processes can be seen in the fact that they have only limited suitability for applications on the large industrial scale. In the first place the batch sizes for polymerization cannot be arbitrarily increased, especially because of reasons of thermal control and mixing of the reaction composition. Furthermore, after each polymerization batch the reaction must be removed from the reaction vessel, the reaction vessel must be cleaned if necessary and the new educt composition must be introduced into the reaction vessel. The maximum polymer yield achievable per unit time by such ATRP processes is therefore reltively small.

From the industrial viewpoint, however, polymerization processes are required that can be scaled simply and in principle arbitrarily and that deliver the highest possible polymer yields per unit time. At the same time, it should be possible to carry out the polymerization processes simply and inexpensively. Intermediate steps such as emptying and possibly cleaning the reaction vessel must be avoided.

In view of the prior art, it was now an object of the present invention to provide, for synthesis of a polymer composition, a process that can be scaled simply and in principle arbitrarily and that delivers the highest possible polymer yields per unit time. In particular, it should be possible to carry out the process for synthesis of a polymer composition simply and inexpensively, without necessitating any intermediate steps such as emptying and cleaning the reaction vessel.

A further object of the present invention was also to provide, for synthesis of a polymer composition, a process in which the polymers contained in the composition have a structure in which at least 50 wt % comprises (meth) acrylates containing alkyl or heteroalkyl chains with at least 8 carbon atoms.

Another object of the present invention was that the polymers contained in the composition must have a narrow molecular weight distribution. In particular, it is intended that the use of relatively complex processes such as anionic polymerization for synthesis of the polymer mixture will be avoided.

A further object was also to be seen in providing, for synthesis of a polymer composition, a process which permits by simple procedures the synthesis of copolymers with a non-statistical structure, especially the synthesis of two-block, three-block and gradient copolymers.

Another object of the present invention was to provide a polymerization process by which polymers with higher or high molecular weights can be obtained.

Yet another object was to provide a process that can be performed inexpensively and applied on a large industrial scale. Furthermore, the process should be possible easily and simply with commercially available components.

These objects are achieved by a process for synthesis of a polymer composition having all features of claim 1, as are other objects which are not explicitly cited but which can be obviously derived or inferred from the relationships discussed herein in the introduction. Advantageous modifications of the inventive process are protected in the dependent claims which refer back to claim 1.

By using a process of the type mentioned in the introduction to polymerize ethylenically unsaturated monomers by means of a continuous ATRP process operation, it has become possible in a way that is not directly foreseeable to provide, for synthesis of a polymer composition, a process that can be scaled simply and in principle arbitrarily and that delivers high polymer yields per unit time. For this purpose ethylenically unsaturated monomers are polymerized by means of initiators containing a transferable atom or group of atoms and of one or more catalysts comprising at least one transition metal in the presence of ligands which can form a coordination compound with the metal catalyst or catalysts. This type of synthesis can be achieved particularly inexpensively and in this regard is eminently suited to continuous industrial production.

At the same time, several other advantages can be achieved by the inventive process. They include among others:

The inventive process does not necessitate any intermediate steps such as emptying and cleaning the reaction vessel.

It is particularly suitable for the synthesis of polymer compositions whose structure comprises at least 50 wt % (meth)acrylates containing alkyl or heteroalkyl chains with at least 8 carbon atoms.

The polymers in the polymerization compositions synthesized by the process are characterized by a narrow molecular weight distribution.

The inventive process permits excellent control of the molecular weight of the polymers contained in the compositions.

The polymerization can be performed with relatively few problems as regards pressure, temperature and solvent, acceptable results being obtained under certain circumstances even at moderate temperatures.

High yields can be achieved by means of the inventive process.

The inventive process has very few side reactions.

The process can be performed inexpensively. In this respect it should be kept in mind that only very low concentrations of catalysts are used.

Furthermore, if metallic copper is used as the copper source, it can be removed from the reaction mixture without problems, and this catalyst can be reused in further reactions without purification.

Polymers with a predetermined composition and tailor-made structure can be synthesized by means of the process of the present invention. In particular, copolymers with a non-statistical structure, especially two-block, three-block and gradient copolymers, are accessible in simple manner by the inventive process.

The polymer compositions obtained in this way can be used for many purposes without the need to separate the copper catalyst present in solution.

By means of the inventive process it is possible to copolymerize monomers with unsaturated ester compounds that themselves can function as ligands. A particularly surprising discovery is that a narrow molecular weight distribution is obtained under these conditions.

According to the present invention, what is polymerized is ethylenically unsaturated monomers. Ethylenically unsaturated monomers are very familiar to those skilled in the art. They include all organic compounds that contain at least one ethylenic double bond.

According to the invention, ethylenically unsaturated monomers are preferred that contain 50 to 100 wt %, preferably 60 to 100 wt % relative to the total weight of ethylenically unsaturated monomers, of one or more ethylenically unsaturated ester compounds of formula (I)

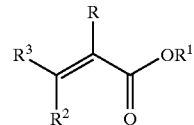

wherein R denotes hydrogen or methyl, $R^1$ denotes a straight-chain or branched alkyl group with 8 to 40, preferably 10 to 40 carbon atoms, especially expediently 10 to 24 carbon atoms, $R^2$ and $R^3$ independently denote hydrogen or a group of the formula —COOR', wherein R' denotes hydrogen or a straight-chain or branched alkyl group with 8 to 40, preferably 10 to 40 carbon atoms. The said alkyl group can be straight-chain, cyclic or branched.

Such compounds according to formula (I) include (meth)acrylates, maleates and fumarates, each of which contains at least one alcohol group with 8 to 40, preferably 10 to 40 carbon atoms.

For this purpose there are preferred (meth)acrylates of formula (II)

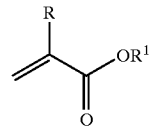

wherein
R denotes hydrogen or methyl and $R^1$ denotes a straight-chain or branched alkyl group with 8 to 40, preferably 10 to 40 carbon atoms.

The expression (meth)acrylates includes methacrylates and acrylates as well as mixtures of the two. These monomers are known. They include among others (meth)acrylates derived from saturated alcohols, such as 2-ethylhexyl (meth)acrylate, octyl (meth)acrylate, nonyl (meth)acrylate, isooctyl (meth)acrylate, isononyl (meth)acrylate, 2-tert-butylheptyl (meth)acrylate, 3-isopropylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth) acrylate, 5-isopropylheptadecyl (meth)acrylate, 4-tert-butyloctadecyl (meth)acrylate, 5-ethyloctadecyl (meth) acrylate, 3-isopropyloctadecyl (meth)acrylate, octadecyl (meth)acrylate, nonadecyl (meth)acrylate, eicosyl (meth) acrylate, cetyleicosyl (meth)acrylate, stearyleicosyl (meth) acrylate, docosyl (meth)acrylate and/or eicosyltetratriacontyl (meth)acrylate; (meth)acrylates derived from unsaturated alcohols, such as oleyl (meth)acrylate; cycloalkyl (meth) acrylates, such as 3-vinyl-2-butylcyclohexyl (meth)acrylate and boryl (meth)acrylate.

The ester compounds with long-chain alcohol groups can be obtained, for example, by reaction of (meth)acrylates, fumarates, maleates and/or the corresponding acids with long-chain fatty alcohols, in which reaction a mixture of esters such as (meth)acrylates with alcohol groups of various chain lengths is generally obtained. These fatty alcohols include among others Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea; Epal® 610 and Epal® 810 of Ethyl Corporation; Linevol® 79, Linevol® 911 and Dobanol® 25L of Shell AG; Lial® 125 of Condea Augusta, Milan; Dehydad® and Lorol® of Henkel KGaA as well as Linopol® 7-11 and Acropol® 91 of Ugine Kuhlmann.

In addition to the ethylenically unsaturated ester compounds designated as component a), which are derived from alcohols with 8 to 40 carbon atoms, the monomer mixture can also contain further ethylenically unsaturated monomers that can be copolymerized with the aforesaid ester compounds. These monomers include among others b) 0 to 40 wt %, especially 0.5 to 20 wt % of one or more (meth)acrylates of formula (III)

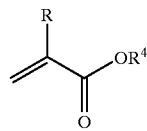

wherein R denotes hydrogen or methyl and $R^4$ denotes a straight-chain or branched alkyl group with 1 to 7 carbon atoms, c) 0 to 40 wt %, especially 0.5 to 20 wt % of one or more (meth)acrylates of formula (IV)

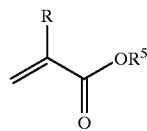

wherein R denotes hydrogen or methyl and $R^5$ denotes an alkyl group, substituted with an OH group, with 2 to 20, especially 2 to 6 carbon atoms, or an ethoxylated group of formula (V)

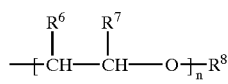

wherein $R^6$ and $R^7$ independently stand for hydrogen or methyl, $R^8$ stands for hydrogen or an alkyl group with 1 to 40 carbon atoms, and n stands for an integral number from 1 to 60, d) 0 to 40 wt %, especially 0.5 to 20 wt % of one or more (meth)acrylates of formula (VI)

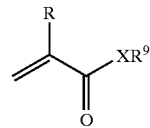

wherein R denotes hydrogen or methyl, X denotes oxygen or an amino group of formula —NH— or —$NR^{10}$—, wherein $R^{10}$ stands for an alkyl group with 1 to 40 carbon atoms, and $R^9$ denotes a straight-chain or branched alkyl group, substituted by at least one —$NR^{11}R^{12}$ group, with 2 to 20, preferably 2 to 6 carbon atoms, wherein $R^{11}$ and $R^{12}$ independently of one another stand for hydrogen, an alkyl group with 1 to 20, preferably 1 to 6, or wherein $R^{11}$ and $R^{12}$, including the nitrogen atom and possibly a further nitrogen or oxygen atom, form a 5-membered or 6-membered ring, which may or may not be substituted with $C_1$ to $C_6$ alkyl, and e) 0 to 40 wt %, especially 0.5 to 20 wt % of one or more comonomers, wherein the wt % value in each case refers to the total weight of ethylenically unsaturated monomers.

Examples of component b) include among others (meth)acrylates derived from saturated alcohols, such as methyl (meth)acrylate, ethyl (meth) acrylate, n-propyl (meth)acrylate, isopropyl (meth)acrylate, n-butyl (meth)acrylate, tert-butyl (meth)acrylate, pentyl (meth) acrylate, hexyl (meth)acrylate, and heptyl (meth) acrylate;

cycloalkyl (meth)acrylates such as cyclopentyl (meth) acrylate and cyclohexyl (meth)acrylate;

(meth)acrylates derived from unsaturated alcohols, such as 2-propynyl (meth)adrylate, allyl (meth)acrylate and vinyl (meth)acrylate.

(Meth)acrylates according to formula (IV) are known to those skilled in the art. They include among others hydroxyalkyl (meth)acrylates such as 3-hydroxypropyl methacrylate, 3,4-dihydroxybutyl methacrylate, 2-hydroxyethyl methacrylate, 2-hydroxyprpyl methacrylate, 2,5-dimethyl-1,6-hexanediol methacrylate, 1,10-decanediol methacrylate, 1,2-propanediol methacrylate;

polyoxyethylene and polyoxypropylene derivatives of (meth)acylic acid, such as triethylene glycol (meth) acrylate, tetraethylene glycol (meth)acrylate and tetrapropylene glycol (meth)acrylate.

The (meth)acrylates or (meth)acrylamides according to formula (VI) (component d) include among others amides of (meth)acrylic acid, such as N-(3-dimethylaminopropyl)methacrylamide, N-(diethylphosphono)methacrylamide, 1-methacryloylamido-2-methyl-2-propanol, N-(3-dibutylaminopropyl)methacrylamide, N-t-butyl-N-(diethylphosphono)methacrylamide, N,N-bis(diethylaminoethyl)methacrylamide, 4-methacryloylamido-4-methyl-2-pentanol, N-(methoxymethyl)methacrylamide,
N-(2-hydroxyethyl)methacrylamide,
N-acetyl methacrylamide,
N-(dimethylaminoethyl)methacrylamide,
N-methyl-N-phenyl methacrylamide,
N,N-diethyl methacrylamide,
N-methyl methacrylamide,
N-N-dimethyl methacrylamide,
N-isopropyl methacrylamide;
aminoalkyl methacrylates, such as
tris(2-methacryloxyethyl)amine,
N-methylformamidoethyl methacrylate,
2-ureidoethyl methacrylate;
heterocyclic (meth)acrylates such as 2-(1-imidazolyl) ethyl (meth)acrylate, 2-(4-morpholinyl)ethyl (meth)acrylate and 1-(2-methacryloyloxyethyl)-2-pyrrolidone.

Component e) comprises in particular ethylenically unsaturated monomers that can be copolymerized with the ethylenically unsaturated ester compounds of formulas (I), (II), (III), (IV) and/or (VI).

Especially suitable as comonomers for polymerization according to the present invention, however, are compounds corresponding to the formula:

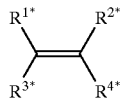

wherein $R^{1*}$ and $R^{2*}$ are selected independently from the group comprising hydrogen, halogens, CN, straight-chain or branched alkyl groups with 1 to 20, preferably 1 to 6 and especially preferably 1 to 4 carbon atoms, which may be substituted with 1 to (2n+1) halogen atoms, wherein n is the number of carbon atoms of the alkyl group (for example, $CF_3$), α,β-unsaturated straight-chain or branched alkenyl or alkynyl groups with 2 to 10, preferably 2 to 6 and especially preferably 2 to 4 carbon atoms, which may be substituted with 1 to (2n–1) halogen atoms, preferably chlorine, wherein n is the number of carbon atoms of the alkyl group, for example $CH_2=CCl-$, cycloalkyl groups with 3 to 8 carbon atoms, which may be substituted with 1 to (2n–1) halogen atoms, preferably chlorine, wherein n is the number of carbon atoms of the cycloalkyl group; $C(=Y^*)R^5$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}_2$, $P(=Y)R^{5*}_2$, $Y^*PR^{5*}_2$, $Y^*P(=Y^*)R^{5*}_2$, $NR^{8*2}$ which can be quaternized with an additional $R^{8*}$, aryl or heterocyclyl group, wherein $Y^*$ can be $NR^{8*}$, S or O, preferably O; $R^{5*}$ is an alkyl group with 1 to 20 carbon atoms, an alkylthio group with 1 to 20 carbon atoms, $OR^{15}$ ($R^5$ is hydrogen or an alkali metal), an alkoxy group with 1 to 20 carbon atoms, an aryloxy or heterocyclyloxy group; $R^{6*}$ and $R^{7*}$ independently are hydrogen or an alkyl group with 1 to 20 carbon atoms, or $R^6$ and $R^{7*}$ together can form an alkylene group with 2 to 7, preferably 2 to 5 carbon atoms, wherein they form a 3-membered to 8-membered ring, preferably a 3-membered to 6-membered ring, and $R^8$ is hydrogen, a straight-chain or branched alkyl group or aryl group with 1 to 20 carbon atoms;

$R^{3*}$ and $R^{4*}$ are independently selected from the group comprising hydrogen, halogen (preferably fluorine or chlorine), alkyl groups with 1 to 6 carbon atoms and $COOR^{9*}$, wherein $R^{9*}$ is hydrogen, an alkali metal or an alkyl group with 1 to 40 carbon atoms, or $R^{1*}$ and $R^{3*}$ together can form a group of formula $(CH_2)_{n'}$, which may be substituted with 1 to 2n' halogen atoms or $C_1$ to $C_4$ alkyl groups, or can form the formula $(C(=O)-Y^*-C(=O)$, wherein n' is from 2 to 6, preferably 3 or 4 and $Y^*$ is as defined hereinabove; and wherein at least 2 of the groups $R^{1*}$, $R^{2*}$, $R^{3*}$ and $R^{4*}$ are hydrogen or halogen.

Component e) comprises in particular ethylenically unsaturated monomers that can be copolymerized with the ester compounds of formula (I). They include among others nitriles of (meth)acrylic acid and other nitrogen-containing methacrylates such as
methacryloylamidoacetonitrile,
2-methacryloyloxyethyl methyl cyanamide,
cyanomethyl methacrylate;
aryl methacrylates, such as benzyl methacrylate or
phenyl methacrylate, wherein each of the aryl groups can be unsubstituted or be substituted at up to four positions;
carbonyl-containing methacrylates, such as
2-carboxyethyl methacrylate,
carboxymethyl methacrylate,
oxazolidinylethyl methacrylate,
N-(methacryloyloxy)formamide,
acetonyl methacrylate,
N-methacryloylmorpholine,
N-methacryloyl-2-pyrrolidinone;
glycol dimethacrylates, such as 1,4-butanediol methacrylate,
2-butoxyethyl methacrylate,
2-ethoxyethoxymethyl methacrylate,
2-ethoxyethyl methacrylate,
methacrylates of ether alcohols, such as
tetrahydrofurfuryl methacrylate,
vinyloxyethoxyethyl methacrylate,
methoxyethoxyethyl methacrylate,
1-butoxypropyl methacrylate,
1-methyl-(2-vinyloxy)ethyl methacrylate,
cyclohexyloxymethyl methacrylate,
methoxymethoxyethyl methacrylate,
benzyloxymethyl methacrylate,
furfuryl methacrylate,
2-butoxyethyl methacrylate,
2-ethoxyethoxymethyl methacrylate,
2-ethoxyethyl methacrylate,
allyloxymethyl methacrylate,
1-ethoxybutyl methacrylate,
methoxymethyl methacrylate,
1-ethoxyethyl methacrylate,
ethoxymethyl methacrylate;
methacrylates of halogenated alcohols, such as
2,3-dibromopropyl methacrylate,
4-bromophenyl methacrylate,
1,3-dichloro-2-propyl methacrylate,
2-bromoethyl methacrylate,
2-iodoethyl methacrylate,
chloromethyl methacrylate;
oxiranyl methacrylates, such as 2,3-epoxybutyl methacrylate,
3,4-epoxybutyl methacrylate,
glycidyl methacrylate;
methacrylates containing phosphorus, boron and/or silicon, such as
2-(dimethylphosphato)propyl methacrylate,
2-(ethylenephosphito)propyl methacrylate,
dimethylphosphinomethyl methacrylate,
dimethylphosphonoethyl methacrylate,
diethylmethacryloyl phosphonate,
dipropylmethacryloyl phosphate;
sulfur-containing methacrylates, such as
ethylsulfinylethyl methacrylate,
4-thiocyanatobutyl methacrylate,
ethylsulfonylethyl methacrylate,
thiocyanatomethyl methacrylate,
methylsulfinylmethyl methacrylate,
bis(methacryloyloxyethyl) sulfide;
trimethacrylates, such as
trimethyloylpropane trimethacrylate;
vinyl halides, such as vinyl chloride, vinyl fluoride, vinylidene chloride and vinylidene fluoride;
vinyl esters, such as vinyl acetate;
styrene, substituted styrenes with an alkyl substituent in the side chain, such as αmethylstyrene and α-ethylstyrene, substituted styrenes with an alkyl substituent on the ring, such as vinyltoluene and p-methylstyrene, halogenated styrenes such as monochlorostyrenes, dichlorostyrenes, tribromostyrenes and tetrabromostyrenes;
heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;
vinyl and isoprenyl ethers;
maleic acid and maleic acid derivatives, such as monoesters and diesters of maleic acid, wherein the alcohol groups have 1 to 9 carbon atoms, maleic anhydride,
methylmaleic anhydride, maleimide, methylmaleimide;
fumaric acid and fumaric acid derivatives, such as monoesters and diesters of fumaric acid, wherein the alcohol groups have 1 to 9 carbon atoms;
dienes such as divinylbenzene.

In addition to styrene there are preferred in particular as comonomers monomers that have dispersing effects, such as the heterocyclic vinyl compounds mentioned hereinabove. These monomers will be referred to hereinafter as dispersing monomers.

The ethylenically unsaturated monomers mentioned hereinabove can be used individually or as mixtures. It is also possible to vary the monomer, composition during polymerization, in order to obtain well defined structures such as block copolymers.

In preferred embodiments of the inventive process, at least 70 weight per cent of the ethylenically unsaturated monomers, especially preferably more than 80 wt % of the ethylenically unsaturated monomers, relative to the total weight of the ethylenically unsaturated monomers are (meth)acrylates, maleates and/or fumarates with alkyl or heteroalkyl chains containing at least 6 carbon atoms.

According to the present invention, the polymerization is carried out by means of continuous process operation. Polymerization processes with continuous process operation are known to those skilled in the art and are frequently referred to as "continuous polymerization processes". According to the invention, a polymerization process with continuous process operation designates a polymerization process in which a starting mixture is fed continuously to the reactor in an open system while simultaneously a certain quantity of reacted product mixture containing polymers is removed from the system.

In the scope of the present invention, it is preferred that the quantity of starting mixture fed to the open system per unit time corresponds to the quantity of product mixture removed per unit time, to ensure that the quantity undergoing reaction remains constant over time it is also conceivable, however, that the quantity of starting mixture fed per unit time can be larger or smaller than the quantity of product mixture removed per unit time.

In the scope of the present invention, the average residence time of the reaction mixture in the reaction vessel can be controlled by the ratio of volume of reaction mixture to the removal rate, or in other words the quantity of product mixture removed per unit time. The corresponding relationships between the volume of reaction mixture, removal rate and mean residence time are know to those skilled in the art. For example, the case of time-invariant volume $V_R$ of reaction mixture and time-invariant removal rate $\Delta V_E/\Delta t_E$ is described by $$\overline{t_{Verweil}} = \frac{V_R}{\Delta V_E / \Delta t_E}$$

where $\overline{t_{Verweil}}$: mean residence time of the reaction mixture in the reaction vessel.

The inventive process can in principle be carried out in reactors designed to permit simultaneous feed of a starting mixture and removal of the product mixture. Suitable reactors are known to those skilled in the art. Examples include flow tubes, cascades of stirred tanks as well as continuous stirred-tank reactors. A contrast can be seen compared with simple stirred tanks (batch reactors, stirred-tank reactors), which indeed permit introduction of the starting mixture but not simultaneous removal of the product mixture.

The flow reactors that can be used according to the invention include among others the so-called continuous plug flow reactors (CPFR), such as the continuous tubular reactor, possibly with downstream proportioning devices, the 2-component mixture with belt reactor, the extruder reactor and tower reactor, and the continuous linear flow reactors.

In the scope of the present invention, cascades are to be understood as reactors connected in series. Examples include tower cascades, stirred-tank cascades and stirred tanks with downstream tower reactor.

In contrast to the "batch reactor", continuous stirred tanks are provided with an inlet and an outlet, which permit simultaneous feed of the starting mixture and removal of the product mixture. For further information on the types of reactor that can be used according to the invention, express reference is made to the disclosures of the technical literature, especially in Hans-Georg Elias, "Macromolecules", Volume 2 "Technology: Raw Materials—Industrial Syntheses—Polymers—Applications", 5th Edition, Basel, Heidelberg, New York; H üthig and Wepf; 1992, p. 109, and in H. Gerrens, "On the choice of polymerization reactors", Chem.-Ing. Techn. 52 (1980) 477.

In a particularly preferred embodiment of the present invention, the reactor is a flow tube.

To carry out the polymerization there are used catalysts that comprise at least one transition metal. For this purpose there can be used any transition metal compound that can participate in a redox cycle with the initiator or with the polymer chain, which contains a transferable atom or group of atoms. In these cycles the transferable atom or group of atoms and the catalyst reversibly form a compound, wherein the oxidation number of the transition metal is raised or lowered. It is assumed that radicals are liberated and trapped in this process, and so the radical concentration remains very low. It is also possible, however, that the insertion of ethylenically unsaturated monomers into the Y—X or Y(M)$_Z$—X bond is made possible or facilitated by the addition of the transition metal compound to the transferable atom or group of atoms, where Y denotes the core molecule that is assumed to form radicals, X represents a transferable atom or a transferable group of atoms and M denotes the monomers, while Z indicates the degree of polymerization.

Preferred transition metals for this purpose are Cu, Fe, Cr, Co, Ne, Sm, Mn, Mo, Ag, Zn, Pd, Pt, Re, Rh, Ir, In, Yd and/or Ru, which can be used in appropriate oxidation numbers. These metals can be used individually and also as mixtures. It is assumed that these metals catalyze the redox cycles of the polymerization, the $Cu^+/Cu^{2+}$ or $Fe^{2+}/Fe^{3+}$ redox couple, for example, being active. Accordingly, the metal compounds are added to the reaction mixture in the form of halides such as chloride or bromide, as alkoxide, hydroxide, oxide, sulfate, phosphate, or hexafluorophosphate, trifluoromethanesulfate. The preferred metal compounds include $Cu_2O$, CuBr, CuCl, CuI, $CuN_3$, CuSCN, CuCN, $CuNO_2$, $CuNO_3$, $CuBF_4$, $Cu(CH_3COO)$, $Cu(CF_3COO)$, FeBr, $RuBr_2$, $CrCl_2$ and $NiBr_2$.

It is also possible, however, to use compounds with higher oxidation numbers, such as $CuBr_2$, $CuCl_2$, CuO, $CrCl_3$, $Fe_2O_3$ and $FeBr_3$. In these cases the reaction can be initiated by means of classical radical sources, such as AIBN. In this case the transition metal compounds are reduced first of all, since they are reacted with the radicals generated from the classical radical sources. Such a process is reverse ATRP, as described by Wang and Matyjaszewski in Macromolecules (1995), Vol. 28, pp. 7572–7573.

Furthermore, the transition metals can be used for catalysis in the form of metals of oxidation number zero, especially in a mixture with the compounds mentioned hereinabove, as is described in, for example, International Patent WO 98/40415. In these cases the rate constant of the reaction can be increased. It is assumed that hereby the concentration of catalytically active transition metal compound is increased by using equal proportions of transition metals having high oxidation numbers and of metallic transition metal.

In the scope of the present invention it is particularly advantageous to carry out the polymerization in the presence of copper as catalyst. In this connection, what is important within the meaning of this embodiment of the invention is the concentration of copper which, during the polymerization, is present in the polymerization composition as oxidized copper of oxidation numbers (I) and (II), preferably oxidation number (+1). Whether copper of oxidation number (+2) can actually also be present and, if so, whether it is relevant for the progress of polymerization, is of no importance for the invention itself. By virtue of the determination method employed, however, the concentration of copper of oxidation number (+2) is included together with copper of oxidation number (+1) in the balance. The concentration of copper of oxidation number (0) in the polymerization composition can be well above the value of 200 ppm, there being no upper limit as long as the concentration of copper of oxidation numbers (I) and (II) is sufficiently low.

In combination with the monomers used in the invention, even very low concentrations of copper of oxidation numbers (I) and (II) lead surprisingly to polymers with relatively narrow distribution. In this case the concentration of oxidized copper of numbers (I) and (II) in the composition can be preferably up to 200 ppm, especially up to 150 ppm and most preferably up to 100 ppm relative to the weight of the total composition. Depending on each special polymerization composition, the minimum concentration of oxidized copper needed for catalysis of ATRP can vary over a well defined range. In general, at least 5 to 10 ppm is advantageous. Concentrations of more than 10 ppm, expediently 20 and more ppm are preferred. A very expedient range comprises 10 to 200 ppm, preferably 20 to 200 ppm and very preferably 50 to 200 ppm. For most applications, the range from 50 to 100 ppm can be regarded as optimal.

The oxidized copper of interest for ATRP of certain relatively long-chain monomers of the invention can be generated from various sources.

In a first and especially preferred version of the process, the inventive process is characterized in that metallic copper is used as the source of copper of oxidation numbers (I) and (II) in the polymerization composition.

Metallic copper can be added to the reaction mixture in any desired form. Preferred copper sources include among others copper sheet, copper wire, copper foil, copper shavings, copper gauze, copper braid, copper textile and or copper powder as well as copper dust, among others. In this connection, sources that can be readily separated once again from the polymer composition, such as copper sheet, copper wire, copper foil and copper braid are preferred over sources that are less easy to separate, such as copper powder or copper dust.

In a particularly advantageous embodiment of the invention, the catalyst is a constituent of the reactor material or comprises the entire reactor material. In a most preferred embodiment, the reactor is a flow tube of copper.

In a further special alternative version of the inventive process, a copper salt is used in the polymerization composition as the source for copper of oxidation numbers (I) and (II). Metal compounds that are usable as copper sources and are preferred according to the invention comprise halides such as chloride or bromide, alkoxides, hydroxides, oxides, sulfates, phosphates, or hexafluorophosphates, trifluoromethanesulfates. The preferred metal compounds include $Cu_2O$, CuBr, CuCl, CuI, $CuN_3$, CuSCN, CuCN, $CuNO_2$, $CuNO_3$, $CuBF_4$, $Cu(CH_3COO)$ and/or $Cu(CF_3COO)$.

In an especially preferred embodiment of the present invention there is used as the copper salt a copper halide, especially expediently copper(I) chloride.

For determination of the quantity (concentration) of copper of oxidation numbers (I) and (II) relevant according to the present invention, the following methods can be adopted, for example, depending on the nature of the copper source.

If metallic copper is chosen as the copper source, the metallic copper source can be removed from the composition after the end of polymerization, for example by extraction from the batch or by filtration. The copper concentration in the remaining polymer composition can be determined by techniques such as ICP spectroscopy (atomic emission spectroscopy), if necessary after digestion procedures known in themselves have been performed. In this way the quantity and thus the concentration of copper(I)+copper(II) liberated from the copper source (oxidized) in the course of polymerization is determined.

If a copper compound (copper salt) is chosen as the source, it is sufficient to determine the initial weight and from this to derive the maximum quantity of copper present in the system.

The monomers mentioned hereinabove are polymerized by means of initiators that contain a transferable group of atoms. In general, these initiators can be described by the formula Y—(X)$_m$, wherein Y and X have the meanings mentioned hereinabove and m denotes an integral number in the range of 1 to 10, depending on the functionality of group Y. If m>1, the various transferable groups X of atoms can have different meanings. If the functionality of the initiator is >2, star polymers are obtained. Preferred transferable atoms or groups of atoms are halogens, such as Cl, Br and/or I.

As mentioned hereinabove, it is assumed that group Y forms radicals that function as initiator molecules, in that this radical adds onto the ethylenically unsaturated monomers. Thus group Y preferably has substituents that can stabilize the radicals. Such substituents include among others —CN, —COR and —CO$_2$R, wherein R in each case denotes an alkyl or aryl group, or aryl an/or heteroaryl groups.

Alkyl groups are saturated or unsaturated, branched or straight-chain hydrocarbon groups with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl groups are cyclic aromatic groups having 6 to 14 carbon atoms in the aromatic ring. These groups may be substituted. Examples of substituents are straight-chain and branched alkyl groups with 1 to 6 carbon atoms, such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups as well as halides.

Examples of aromatic groups include phenyl, xylyl, toluyl, naphthyl or biphenylyl.

The expression "heteroaryl" denotes a heteroaromatic ring system, wherein at least one CH group is replaced by N or two neighboring CH groups are replaced by S, O or NH, such as a thiophene, furan, pyrrole, thiazole, oxazole, pyridine, pyrimidine and benzo[a]furan group, which may also contain the substituents mentioned hereinabove.

An initiator that is usable according to the invention can be any compound that contains one or more atoms or groups of atoms which can be transferred by a radical mechanism under the polymerization conditions.

Suitable initiators include those of the formulas:

$R^{11}R^{12}R^{13}C—X$ $R^{11}C(=O)—X$

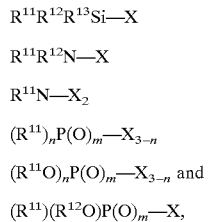

wherein X is selected from the group comprising Cl, Br, I, OR$^{10}$ [wherein R$^{10}$ denotes an alkyl group with 1 to 20 carbon atoms, wherein each hydrogen atom independently can be replaced by a halide, preferably fluoride or chloride, alkenyl with 2 to 20 carbon atoms, preferably vinyl, alkynyl with 2 to 10 carbon atoms, preferably acetylenyl, phenyl, which may be substituted with 1 to 10 halogen atoms or alkyl groups with 1 to 4 carbon atoms, or aralkyl (aryl-substituted alkyl in which the aryl group is phenyl or substituted phenyl and the alkyl group represents an alkyl with 1 to 6 carbon atoms, such as benzyl)]; SR$^{14}$, SeR$^{14}$, OC(=O)R$^{14}$, OP(=O)R$^{14}$, OP(=O)(OR$^{14}$)$_2$, OP(=O)OR$^{14}$, O—N(R$^{14}$)$_2$, S—C(=S)N(R$^{14}$)$_2$, CN, NC, SCN, CNS, OCN, CNO and N$_3$, wherein R$^{14}$ denotes an aryl group or a straight-chain or branched alkyl group with 1 to 20, preferably 1 to 9 carbon atoms, wherein two R$^{14}$ groups, if present, can together form a heterocyclic ring with 5, 6 or 7 members; and R$^{11}$, R$^{12}$ and R$^{13}$ are chosen independently from the group comprising hydrogen, halogens, alkyl groups with 1 to 20, preferably 1 to 10 and especially preferably 1 to 6 carbon atoms, cycloalkyl groups with 3 to 8 carbon atoms, R$^{8*}_3$Si, C(=Y*)R$^{5*}$, C(=Y*)NR$^{6*}$R$^{7*}$, wherein Y* R$^{5*}$, R$^{6*}$ and R$^{7*}$ are as defined hereinabove, COCl, OH (preferably one of the groups R$^{11}$, R$^{12}$ and R$^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, wherein aryl is as defined hereinabove and alkenyl is vinyl substituted with one or two C$_1$ to C$_6$ alkyl groups and/or halogen atoms, preferably with chlorine), alkyl groups with 1 to 6 carbon atoms, in which one to all of the hydrogen atoms, preferably one, are substituted by halogen (preferably fluorine or chlorine, if one or more hydrogen atoms are replaced, and preferably fluorine, chlorine or bromine if one hydrogen atom is replaced), alkyl groups with 1 to 6 carbon atoms, which are substituted with 1 to 3 substituents (preferably 1) chosen from the group comprising C$_1$ to C$_4$ alkoxy, aryl, heterocyclyl, C(=Y*)R$^{5*}$ (wherein R$^{5*}$ is as defined hereinabove), C(=Y*)NR$^{6*}$N$^{7*}$ (wherein R$^{6*}$ and R$^{7*}$ are as defined hereinabove), oxiranyl and glycidyl (preferably not more than 2 of the groups R$^{11}$, R$^{12}$ and R$^{13}$ are hydrogen, and especially preferably at most one of the groups R$^{11}$, R$^{12}$ and R$^{13}$ is hydrogen); m=0 or 1; and m denotes 0, 1 or 2.

The particularly preferred initiators include benzyl halides, such as p-chloromethylstyrene, α-dichloroxylene, α,α-dichloroxylene, α,α-dibromoxylene and hexakis(α-bromomethyl)benzene, benzyl chloride, benzyl bromide, 1-bromo-1-phenylethane and 1-chloro-1-phenylethane;

carboxylic acid derivatives which are halogenated at the α-position, such as propyl 2-bromopropionate, methyl 2-chloropropionate, ethyl 2-chloropropionate, methyl 2-bromopropionate, ethyl 2-bromoisobutyrate;

tosyl halides such as p-toluenesulfonyl chloride; alkyl halides such as tetrachloromethane, tribromomethane, 1-vinylethyl chloride, 1-vinylethyl bromide;

and halogen derivatives of phosphoric acid esters, such as dimethylphosphoric acid chloride.

The initiator is generally used in a concentration in the range of $10^{-4}$ mol/L to 3 mol/L, preferably in the range of $10^{-3}$ mol/L to $10^{-1}$ mol/L and especially preferably in the range of $5*10^{-2}$ mol/L to $5*10^{-1}$ mol/L, although these values are not to be construed as limitative. From the ratio of initiator to monomer there is obtained the molecular weight of the polymer, if the entire monomer is reacted. Preferably this ratio ranges between $10^{-4}$ and 1 to between 0.5 and 1, especially preferably between $1*10^{-3}$ and 1 to between $5*10^{-2}$ and 1.

The polymerization takes place in the presence of ligands that can form a coordination compound with the metallic catalyst or catalysts. Among other effects, these ligands function to increase the solubility of the transition metal compound. A further important function of the ligands is that the formation of stable organometallic compounds is prevented. This is particularly important, since these stable compounds would not polymerize under the chosen reaction conditions. It is further assumed that the ligands facilitate abstraction of the transferable atom or group of atoms.

These ligands are known in themselves and are described in, for example, International Patents WO 97/18247 and WO 98/40415. These compounds generally contain one or more nitrogen, oxygen, phosphorus and/or sulfur atoms, via which the metal atom can be bound. Many of these ligands can be represented in general by the formula $R^{16}$—Z—$(R^{18}$—Z$)_m$—$R^{17}$, wherein $R^{16}$ and $R^{17}$ independently denote H, $C_1$ to $C_{20}$ alkyl, aryl, heterocyclyl, which may or may not be substituted. Such substituents include among others alkoxy groups and alkylamino groups. $R^{16}$ and $R^{16}$ may or may not form a saturated, unsaturated or heterocyclic ring. Z denotes O, S, NH, $NR^{19}$ or $PR^{19}$, wherein $R^{19}$ has the same meaning as $R^{16}$. $R^{18}$ independently denotes a divalent group with 1 to 40 C atoms, preferably 2 to 4 C atoms, which may be straight-chain, branched or cyclic, such as a methylene, ethylene, propylene or butylene group. The meaning of alkyl and aryl has been explained hereinabove. Heterocyclic groups are cyclic groups with 4 to 12 carbon atoms, in which one or more of the $CH_2$ groups of the ring is or are replaced by heteroatom-containing groups, such as O, S, NH and/or NR, wherein the group R has the same meaning as $R^{16}$.

A further group of suitable ligands can be represented by the formula

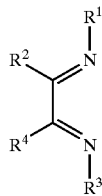

wherein $R^1$, $R^2$, $R^3$ and $R^4$ independently denote H, C, to $C_{20}$ alkyl aryl, heterocyclyl and/or heteroaryl groups, wherein the groups $R^1$ and $R^2$ or respectively $R^3$ and $R^4$ can together form a saturated or unsaturated ring.

Preferred ligands in this connection are chelate ligands containing N atoms. The preferred ligands include among others triphenylphosphane, 2,2-bipyridine, alkyl-2,2-bipyridine, such as 4,4-di-(5-nonyl)-2,2-bipyridine, 4,4-di-(5-heptyl)-2,2-bipyridine, tris(2-aminoethyl)amine (TREN), N,N,N',N',N''-pentamethyldiethylenetriamine, 1,1,4,7,10, 10-hexamethyltriethylenetetramine and/or tetramethylethylenediamine. Further preferred ligands are described in, for example, International Patent WO 97/47661. The ligands can be used individually or as a mixture.

These ligands can form coordination compounds in situ with copper metal or copper compounds, or they can be synthesized first as coordination compounds and then added to the reaction mixture.

The ratio of ligand to transition metal copper depends on the dentate number of the ligand and on the coordination number of the copper. In general, the molar ratio ranges from 100:1 to 0.1:1, expediently from 10:1 to 0.1:1, preferably from 6:1 to 0.1:1 and especially preferably from 3:1 to 0.5:1, although these values are not to be construed as limitative.

The monomers, copper catalysts, ligand and initiators are selected as a function of the desired polymer solution. It is assumed that a high rate constant of the reaction between the copper-ligand complex an the transferable atom or group of atoms is essential for a narrow molecular weight distribution. If the rate constant of this reaction is too low, the concentration of radicals becomes too high, and so the typical termination reactions responsible for a broad molecular weigh distribution occur. The exchange rate depends on, for example, the transferable atom or group of atoms, the transition metal and the ligands.

The process of the present invention can be performed as bulk polymerization without solvent. Bulk polymerization already leads to very good results. In preferred embodiments of the process, nonpolar solvents are used. Of course, the concentration of copper of oxidation numbers (I) and (II) is not permitted to exceed the values specified hereinabove.

The nonpolar solvents include hydrocarbon solvents, examples being aromatic solvents such as toluene, benzene and xylene, and saturated hydrocarbons such as cyclohexane, heptane, octane, nonane, decane, dodecane, which may also be used in branched form. These solvents can be used individually and also as a mixture. Particularly preferred solvents are mineral oils and synthetic oils as well as mixtures thereof. Of these, mineral oils are particularly preferred.

Mineral oils are known in themselves and are commercially available. They are generally obtained from petroleum or crude oil by distillation and/or refining and if necessary further purification and conversion processes. In this connection the term mineral oil applies in particular to the higher-boiling fractions of crude oil or petroleum. In general, the boiling point of mineral oil is higher than 200° C., preferably higher than 300° C. at 5000 Pa. Synthesis by low-temperature carbonization of shale oil, coking of bituminous coal, distillation of lignite with exclusion of air as well as hydrogenation of bituminous coal or lignite is also possible. A small proportion of mineral oils is also obtained from raw materials originating from plants (such as jojoba, rape) or animals (such as neatsfoot oil). Accordingly, mineral oils contain various proportions of aromatic, cyclic, branched and straight-chain hydrocarbons, depending on origin.

In general, a distinction is made between paraffin-base, naphthenic and aromatic fractions in crude oils or mineral oils. In this connection the term paraffin-base fraction stands for relatively long-chain or highly branched isoalkanes, and naphthenic fraction stands for cycloalkanes. Furthermore, depending on their origin and conversion process, mineral oils contain different proportions of n-alkanes, isoalkanes with low degree of branching, so-called monomethyl-branched paraffins, and compounds with heteroatoms, especially O, N and/or S, with which there are associated polar properties. The proportion of n-alkanes in preferred mineral oils is less than 3 wt %, the proportion of the compounds containing O, N and/or S is less than 6 wt %. The proportion of aromatics and of monomethyl-branched paraffins is generally in the range of 0 to 30 wt % each. According to one interesting aspect, mineral oil comprises mainly naphthenic and paraffin-base alkanes, which in general contain more than 13, preferably more than 18 and especially preferably more than 20 carbon atoms. The proportion of these compounds is generally ≧60 wt %, preferably ≧80 wt %, but these values are not to be construed as limitative.

An analysis of especially preferred mineral oils performed using conventional techniques such as urea separation and liquid chromatography on silica gel reveals, for example, the following constituents. In this connection, the percentage values refer to the total weight of the particular mineral oil being used:

n-alkanes with about 18 to 31 C atoms:
  0.7 to 1.0%,
slightly branched alkanes with 18 to 31 C atoms:
  1.0 to 8.0%,
aromatics with 14 to 32 atoms:
  0.4 to 10.7%,
isoalkanes and cycloalkanes with 20 to 32 C atoms:
  60.7 to 82.4%,
polar compounds:
  0.1 to 0.8%
loss:
  6.9 to 19.4%.

Valuable information on analysis of mineral oils as well as a listing of mineral oils having different composition can be found in, for example, Ullmanns Encyclopedia of Industrial Chemistry, 5th Edition on CD-ROM, 1997, key word "lubricants and related products".

Synthetic oils include among other compounds organic esters, organic ethers such as silicone oils, and synthetic hydrocarbons, especially polyolefins. They are usually somewhat more expensive than mineral oils, but have advantages in terms of performance. Further elucidation can be found in the 5 API categories of base-oil types (API: American Petroleum Institute). In this connection these base oils can be used particularly preferably as solvents.

These solvents are used before or during filtration, preferably in a proportion of 1 to 99 wt %, especially preferably 5 to 95 wt % and most preferably 10 to 60 wt % relative to the total weight of the mixture.

The polymerization can be performed at normal, reduced or above-atmospheric pressure. The polymerization temperature also is not critical. In general, however, it ranges from −200 to 200° C., preferably from 0° to 130° C. and especially preferably from 600 to 120° C., although these values are not to be construed as limitative.

By means of the present process, polymers with a predetermined architecture can be obtained in simple manner. These possibilities result form the "living" character of the polymerization process. Such structures include among others block copolymers, such as two-block and three-block copolymers, gradient copolymers, star polymers, highly branched polymers, polymers with reactive terminal groups and graft copolymers. According to the invention there are preferred copolymers with non-statistical structure, especially two-block, three-block or gradient polymers, which can be obtained, for example, by proportioning a second monomer mixture and if necessary further monomer mixtures to a polymer that had been previously synthesized in a process of the present invention.

In the scope of the present invention, a process is also advantageous which includes the steps in which a) ethylenically unsaturated monomers are polymerized according to the invention by means of continuous process operation, b) the metal-containing reaction product from a) is fed to a receiver and c) is metered into a composition containing ethylenically unsaturated monomers, in this way initiating a further ATRP polymerization, the polymerization in c) being carried out in a batch or continuous process.

Also advantageous is a process which includes the steps in which a) ethylenically unsaturated monomers are polymerized in the batch process by means of initiators containing a transferable atom or group of atoms and of one or more catalysts comprising at least one transition metal in the presence of ligands which can form a coordination compound with the metal catalyst or catalysts, b) the metal-containing reaction product from a) is fed to a receiver and c) is metered into a composition containing ethylenically unsaturated monomers, in this way initiating a further ATRP polymerization, the polymerization in c) being carried out in a batch or continuous process.

The polymers synthesized according to the invention generally have a molecular weight ranging from 1,000 to 1,000,000 g/mol, preferably from $7*10^3$ to $500*10^3$ g/mol, especially preferably from $7*10^3$ to $300*10^3$ g/mol, although these values are not to be construed as limitative. These values refer to the weight-average molecular weight of the polydisperse polymers in the composition.

The special advantage of ATRP compared with conventional radical polymerization processes is that polymers with a narrow molecular weight distribution can be synthesized. While the following values are not to be construed as limitative, polymers obtained by the inventive process have a polydispersity, expressed by $M_w/M_n$, ranging from 1 to 12, preferably from 1 to 4.5, especially preferably from 1 to 3 and most preferably from 1.05 to 2.

The low concentrations of catalyst, as are typical according to the invention, generally do not cause interference in the intended applications, and so there may be no need to perform separation of the catalysts.

For special applications, in which even the low inventive concentrations may cause interference, dissolved catalyst can be separated by a solid-liquid separation method. Chromatography, centrifugation and filtration are examples of techniques for this purpose.

Preferably the catalyst is removed by filtration. For this purpose the oxidation number of the transition metal is raised following polymerization. Oxidation of the transition metal leads to decreased catalyst solubility, to a degree depending on the choice of ligand or ligands, and so the transition metal can be separated by filtration in the presence of a solvent, especially a mineral oil, whose dielectric constant is ≦4, preferably ≦3 and especially preferably ≦2.5.

Oxidation of the transition metal can be achieved with known oxidizing agents such as oxygen, $H_2O_2$ or ozone. Preferably the catalyst will be oxidized with atmospheric oxygen. It is not necessary to bring about complete oxidation of the transition metal or of the transition metal compound. In many cases it is sufficient to bring the composition into contact with atmospheric oxygen for a few minutes in order to ensure sufficient precipitation of the transition metal compound.

Filtration is known in itself and is described in, for example, Ullmann's Encyclopedia of Industrial Chemistry, Fifth Edition, key word "Filtration". Preferably the composition is purified at a pressure difference ranging from 0.1 to 50 bar, preferably 1 to 10 bar and especially preferably 1.5 to 2.5 bar with a filter having a sieve size ranging from 0.01 μm to 1 mm, preferably 1 μm to 100 μm and especially preferably 10 μm to 100 μm. These values are to be considered as reference points, since the purification also depends on the viscosity of the solvent and on the particle size of the precipitate.

The filtration is performed in a temperature range similar to that of polymerization, the upper range being dependent on the stability of the polymers. The lower limit is determined by the viscosity of the solution.

The poly(meth)acrylate composition synthesized in this way can be used without further purification as, for example, an additive in lubricating oils. Furthermore, the polymer can be isolated from the composition. For this purpose the polymers can be separated from the composition by precipitation.

The invention will be explained in more detail hereinafter by examples and comparison examples, although the invention is not to be construed as limited to these examples.

Educts

The starting portion of DPMA (dodecylpentadecyl methacrylate) to be used was weighed out, allowing for a purity of 98%. EBiB (ethyl 2-bromoisobutyrate) and PMDETA (pentamethyldiethylenetriamine) were obtained from Aldrich and, in common with MMA (methyl methacrylate) (Rohm & Haas), were weighed out as starting portions assuming a purity of 100%. The paraffin oil used was a 100N oil manufactured by Petro Canada.

EXAMPLE 1

For a continuous ATRP reaction, a coiled copper tube (wall diameter 2 mm) having a length of 2 m and a thickness of 7 mm was immersed in a heatable water bath. By means of a proportioning pump, 500 ml of a mixture comprising 425 ml of dodecylpentadecyl methacrylate (DPMA) and methyl methacrylate (MMA) in the weight ratio of 0.85:0.15, 75 ml of a 100N oil, 10 mmol of pentamethyldiethylenetriamine (PMDETA) as well as 10.25 mmol of ethyl-2-bromoisobutyrate (EBiB) was fed to the tube. This corresponds to a target molecular weight of 80,000 g/mol. The proportioning rate was adjusted such that a residence time of 3.75 to 4 hours was ensured in the copper tube, which was heated to 90° C. The resulting polymer had a pale greenish color and was collected continuously, directly after passage through the copper tube. A GPC analysis of the reaction product was performed periodically, and yielded the values presented in Table 1. The good agreement between theoretical and experimental Mn values as well as the narrow molecular weight distribution prove that a controlled polymerization process had occurred. The degree of conversion was 98%.

Table 1. Mn and PDI values of a continuous ATRP process as a function of process duration (residence time of the monomer mixture in the reactor was constant at approximately 4 hours.

| Sample | Time [h] | Mn [g/mol] | PDI |
|---|---|---|---|
| 1-1 | 1 | 46,500 | 1.72 |
| 1-2 | 3 | 45,900 | 1.5 |
| 1-3 | 4 | 52,700 | 1.47 |
| 1-4 | 27 | 88,400 | 1.42 |

EXAMPLE 2

For a continuous ATRP reaction, a coiled copper tube (wall diameter 2 mm) having a length of 2 m and a thickness of 7 mm was immersed in a heatable water bath. By means of a proportioning pump, 50.0 ml of a mixture comprising 42.5 ml of dodecylpentadecyl methacrylate (DPMA) and methyl methacrylate (MMA) in the weight ratio of 0.85:0.15, 7.5 ml of a 100N oil, 10 mmol of pentamethyldiethylenetriamine (PMDETA) as well as 10.25 mmol of ethyl 2-bromoisobutyrate (EBiB) was fed to the tube. This corresponds to a target molecular weight of 8,000 g/mol.

After a flow time of about 45 minutes in the copper tube, the reaction product of the continuous process carried out in this way was fed directly to 450 ml of a mixture comprising 382.5 ml of dodecylpentadecyl methacrylate (DPMA) and methyl methacrylate (MMA) in the weight ratio of 0.85:0.15 and 67.5 ml of a 100N oil, after which further polymerization was carried out in a batch process at 90° C.

The GPC analysis of the continuously synthesized polymer of the first reaction step indicated an Mn value of 14,000, an Mw/Mn value of 1.16 and a degree of conversion of 95%. The GPC results for the second reaction step, or in other words the batch polymerization, are summarized in Table 2. They prove once again that a controlled polymerization had occurred. The degree of conversion was 98%. Consequently, the addition of a small volume of a continuously synthesized polymer to a receiver (volume ratio of copper containing feed to receiver=0.1:1) is sufficient to operate an ATRP process.

TABLE 2

Mn and PDI values of an ATRP batch process, which was catalyzed by addition of a continuously synthesized ATRP product

| Sample | Time [h] | Mn [g/mol] | PDI |
|---|---|---|---|
| 2-1 | 4 | 25,400 | 1.17 |
| 2-2 | 10 | 122,000 | 1.32 |

What is claimed is:

1. A process for the synthesis of a polymer composition, comprising:

polymerizing an ethylenically unsaturated monomer in the presence of
1) an initiator containing a transferable group of atoms, and
2) one or more metal catalysts comprising at least one transition metal, and
3) ligands which form a coordination compound with the metal catalyst;

to obtain a transition metal-containing reaction product;

wherein said process is a continuous process; and wherein the ethylenically unsaturated monomer comprises 50 to 100 wt % of one or more ethylenically unsaturated ester compounds of formula (I), based on a total weight of ethylenically unsaturated monomers

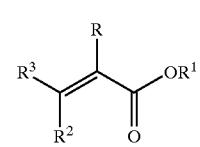

(I)

wherein R denotes hydrogen or methyl,
wherein $R^1$ denotes a straight-chain or branched alkyl group with 10 to 40 carbon atoms,
wherein each of $R^2$ and $R^3$ independently denote hydrogen or a group of the formula —COOR′, wherein R' denotes hydrogen or a straight-chain or branched alkyl group with 10 to 40 carbon atoms, wherein a source of said metal catalyst is a constituent of a reactor material or wherein said source comprises an entire reactor material.

2. The process according to claim 1, wherein copper is used as the metal catalyst; and wherein a total concentration of oxidized copper of oxidation numbers (I) and (II) in the polymer composition is ≦200 ppm based on a total weight of the polymer composition.

3. The process according to claim 1, wherein a total concentration of oxidized copper of oxidation numbers (I) and (II) in the polymer composition is ≦150 ppm based on a total weight of the polymer composition.

4. The process according to claim 2, wherein metallic copper is used as a source of oxidized copper of oxidation numbers (I) and (II).

5. The process according to claim 1, wherein at least one chelate ligand containing a nitrogen atom is used.

6. The process according to claim 1, wherein said initiator comprises at least one group selected from the group consisting of Cl, Br, I, SCN and $N_3$.

7. The process according claim 1, wherein said polymerizing is carried out in solution.

8. The process according claim 1, wherein a mineral oil, a synthetic oil or a mixture thereof is used as solvent.

9. The process according to claim 8, wherein the solvent is used in a proportion ranging from 5 to 95 wt % based on a total weight of the solvent and the ethylenically unsaturated monomer.

10. The process according to claim 1, wherein the solvent is used in a proportion ranging from 10 to 60 wt % based on the total weight of the solvent and the ethylenically unsaturated monomer.

11. The process according to claim 1, further comprising:

feeding said transition metal-containing reaction product to a receiver; and metering said transition metal-containing reaction product into a composition containing ethylenically unsaturated monomers, thereby initiating a further ATRP polymerization;

wherein said further ATRP polymerization is carried out in a batch process or a continuous process.

12. A process, comprising:

a) polymerizing ethylenically unsaturated monomers in a batch process in the presence of:
   1) an initiator containing a transferable atom or group of atoms, and
   2) one or more metal catalysts comprising at least one transition metal, and
   3) ligands which form a coordination compound with the metal catalyst, thereby obtaining a transition metal-containing reaction product;

b) feeding said transition metal-containing reaction product to a receiver; and c) metering said transition metal-containing reaction product into a composition containing ethylenically unsaturated monomers, thereby initiating a further ATRP polymerization, wherein said further ATRP polymerization is carried out in a batch process or a continuous process; and wherein the ethylenically unsaturated monomer comprises 50 to 100 wt % of one or more ethylenically unsaturated ester compounds of formula (I), based on a total weight of ethylenically unsaturated monomers

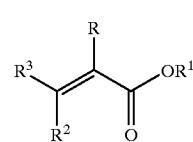

(I)

wherein R denotes hydrogen or methyl, wherein $R^1$ denotes a straight-chain or branched alkyl group with 10 to 40 carbon atoms, wherein each of $R^2$ and $R^3$ independently denote hydrogen or a group of the formula—COOR', wherein R' denotes hydrogen or a straight-chain or branched alkyl group with 10 to 40 carbon atoms, wherein a source of said metal catalyst is a constituent of a reactor material or wherein said source comprises an entire reactor material.

13. The process according to claim 1, wherein the ethylenically unsaturated monomer comprises at least 50 wt % of one or more (meth)acrylates of formula (II)

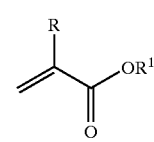

(II)

wherein R denotes hydrogen or methyl; and wherein $R^1$ denotes a straight-chain or branched alkyl group with 8 to 40 carbon atoms.

14. The process according to claim 1, the ethylenically unsaturated monomer comprises a) 60 to 100 wt % of one or more ethylenically unsaturated ester compounds of formula (I)

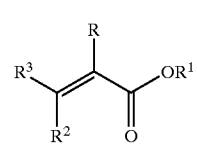

(I)

wherein R denotes hydrogen or methyl, wherein $R^1$ denotes a straight-chain or branched alkyl group with 8 to 40 carbon atoms, wherein each of $R^2$ and $R^3$ independently denote hydrogen or a group of the formula —COOR', wherein R' denotes hydrogen or a straight-chain or branched alkyl group with 8 to 40 carbon atoms, b) 0 to 40 wt % of one or more (meth)acrylates of formula (III)

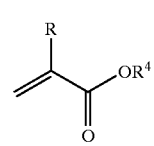

(III)

wherein R denotes hydrogen or methyl; and wherein R denotes a straight-chain or branched alkyl group with 1 to 7 carbon atoms, c) 0 to 40 wt % of one or more (meth)acrylates of formula (IV)

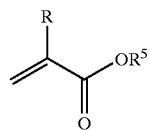

wherein R denotes hydrogen or methyl; and
wherein $R^5$ denotes i) an alkyl group with 2 to 20 carbon atoms, substituted with an OH group, or ii) an ethoxylated group of formula (V)

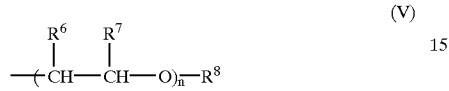

wherein each of $R^6$ and $R^7$ independently represent hydrogen or methyl,
wherein $R^8$ represents hydrogen or an alkyl group with 1 to 40 carbon atoms, and
wherein n represents for an integral number from 1 to 60, d) 0 to 40 wt % of one or more (meth)acrylates of formula (VI)

wherein R denotes hydrogen or methyl,
wherein X denotes oxygen or an amino group of formula —NH— or —$NR^{10}$—, wherein $R^{10}$ stands for an alkyl group with 1 to 40 carbon atoms, and
wherein $R^9$ denotes a straight-chain or branched alkyl group with 2 to 20 carbon atoms, substituted by at least one —$NR^{11}R^{12}$ group, wherein $R^{11}$ and $R^{12}$ independently of one another stand for hydrogen, an alkyl group with 1 to 20 carbon atoms or wherein $R^{11}$ and wherein $R^{11}$ and $R^{12}$, including the nitrogen atom and optionally a further nitrogen or oxygen atom, form a 5-membered or 6-membered ring, which may or may not be substituted with $C_1$ to $C_6$ alkyl, and e) 0 to 40 wt % of one or more comonomers,
wherein the wt % value in each case refers to a total weight of said ethylenically unsaturated monomers.

15. The process according to claim 14, wherein the comonomer is selected from the group consisting of styrene, a (meth)acrylate compound and a dispersing monomer.

16. The process according to claim 1, wherein said polymer composition comprises polymers having a weight-average molecular weight of $\geq 7,000$ g/mol

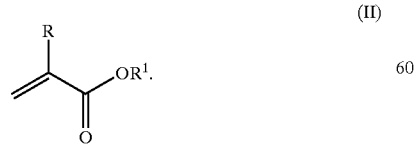

17. The process according to claim 1, wherein said polymer composition comprises a copolymer with non-statistical structure.

18. The process according to claim 1, further comprising isolating said polymer composition from a polymer solution.

19. The process according to claim 3, wherein the total concentration of oxidized copper of oxidation numbers (I) and (II) in the polymer composition is $\leq 100$ ppm based on the total weight of the polymer composition.

20. The process according to claim 17, wherein said copolymer is a two-block copolymer, a three-block copolymer or a gradient copolymer.

21. The process according to claim 12, wherein the ethylenically unsaturated monomers comprise at least 50 wt % of one or more (meth)acrylates of formula (II)
wherein R denotes hydrogen or methyl; and
wherein $R^1$ denotes a straight-chain or branched alkyl group with 8 to 40 carbon atoms.

22. The process according to claim 12, wherein the ethylenically unsaturated monomers comprise a) 60 to 100 wt % of one or more ethylenically unsaturated ester compounds of formula

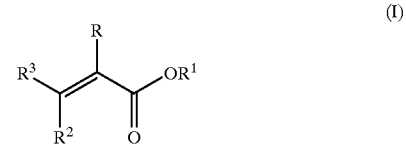

wherein R denotes hydrogen or methyl,
wherein $R^1$ denotes a straight-chain or branched alkyl group with 8 to 40 carbon atoms,
wherein each of $R^2$ and $R^3$ independently denote hydrogen or a group of the formula —COOR', wherein R' denotes hydrogen or a straight-chain or branched alkyl group with 8 to 40 carbon atoms, b) 0 to 40 wt % of one or more (meth)acrylates of formula (III)

wherein R denotes hydrogen or methyl; and
wherein $R^4$ denotes a straight-chain or branched alkyl group with 1 to 7 carbon atoms, c) 0 to 40 wt % of one or more (meth)acrylates of formula (IV)

wherein R denotes hydrogen or methyl; and
wherein $R^5$ denotes an i) alkyl group with 2 to 20 carbon atoms, substituted with an OH group, or ii) an ethoxylated group of formula (V)

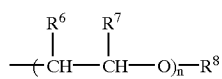

wherein each of $R^6$ and $R^7$ independently represent hydrogen or methyl,
wherein $R^8$ represents hydrogen or an alkyl group with 1 to 40 carbon atoms, and
wherein n represents for an integral number from 1 to 60,
d) 0 to 40 wt % of one or more (meth)acrylates of formula (VI)

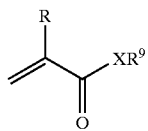

wherein R denotes hydrogen or methyl,
wherein X denotes oxygen or an amino group of formula —NH— or —$NR^{10}$—,
wherein $R^{10}$ stands for an alkyl group with 1 to 40 carbon atoms, and
wherein $R^9$ denotes a straight-chain or branched alkyl group with 2 to 20 carbon atoms, substituted by at least one —$NR^{11}R^{12}$ group, wherein $R^{11}$ and $R^{12}$ independently of one another stand for hydrogen, an alkyl group with 1 to 20 carbon atoms or wherein $R^{11}$ and wherein $R^{11}$ and $R^{12}$, including the nitrogen atom and optionally a further nitrogen or oxygen atom, form a 5-membered or 6-membered ring, which may or may not be substituted with $C_1$ to $C_6$ alkyl, and
e) 0 to 40 wt % of one or more comonomers,
wherein the wt % value in each case refers to a total weight of said ethylenically unsaturated monomers.

23. The process according to claim 22, wherein the comonomer is selected from the group consisting of styrene, a (meth)acrylate compound and a dispersing monomer.

24. The process according to claim 12, wherein said polymer composition comprises polymers having a weight-average molecular weight of $\geq 7,000$ g/mol.

25. The process according to claim 12, wherein said polymer composition comprises a copolymer with non-statistical structure.

26. The process according to claim 12, further comprising isolating said polymer composition from a polymer solution.

27. The process according to claim 25, wherein said copolymer is a two-block copolymer; a three-block copolymer or a gradient copolymer.

28. The process according to claim 1, wherein said reactor is a flow tube of copper.

29. The process according to claim 12, wherein said reactor is a flow tube of copper.

* * * * *